United States Patent [19]

Wallace

[11] 4,420,604

[45] Dec. 13, 1983

[54] ADMIXTURE OF 2,4,6-TRIS(DIMETHYL AMINOMETHYL)PHENYL AS A CURING AGENT FOR AN EPOXY THREAD LOCKING COMPOSITION

[75] Inventor: Richard B. Wallace, Bloomfield Hills, Mich.

[73] Assignee: The Oakland Corporation, Troy, Mich.

[21] Appl. No.: 227,624

[22] Filed: Jan. 23, 1981

[51] Int. Cl.$^3$ ............................................. C08G 59/62
[52] U.S. Cl. ........................................................ 528/93
[58] Field of Search .......................................... 528/93

[56] References Cited

U.S. PATENT DOCUMENTS

| | | | |
|---|---|---|---|
| 3,061,455 | 10/1962 | Anthony | 411/258 X |
| 4,059,136 | 11/1977 | Wallace | 411/258 X |
| 4,081,012 | 3/1978 | Wallace | 411/258 X |
| 4,221,890 | 9/1980 | Dimmick | 528/93 X |
| 4,226,969 | 10/1980 | Watson et al. | 528/93 |

OTHER PUBLICATIONS

Rose et al., The Condensed Chemical Dictionary, 7th Ed., Reinhold Publ. Co., N.Y., p. 353 (1966).

*Primary Examiner*—Lucille M. Phynes
*Attorney, Agent, or Firm*—Barnes, Kisselle, Raisch, Choate, Whittemore & Hulbert

[57] ABSTRACT

A thread lock fastener and the method of operation thereof, in which threaded members are locked together by a locking compound including epoxy resin cured in place by approximately an equal amount of Tris (dimethylaminomethyl) phenol as an activator. The thread lock exhibits an unexpectedly high torque locking action and an unexpectedly high resistance to elevated temperatures.

12 Claims, No Drawings

ADMIXTURE OF 2,4,6-TRIS(DIMETHYL AMINOMETHYL)PHENYL AS A CURING AGENT FOR AN EPOXY THREAD LOCKING COMPOSITION

BRIEF SUMMARY OF THE INVENTION

The present invention is an improvement over the inventions disclosed in my prior U.S. Pat. Nos. 4,059,136 and 4,081,012, and attention is called to Anthony U.S. Pat. No. 3,061,455, directed to related subject matter.

In these prior patents, uncured epoxy resin and a conventional activator are mixed together and cured or polymerized in place between the threads of engaged threaded fasteners. As disclosed in all of these patents the epoxy monomer and the activator are applied to adjacent areas on the thread grooves of one fastener, and covered with a rupturable protective film until used. When a pair of fastener elements are screwed together, the film is ruptured, the resin and activator mixed together, and the resin mixture cures in place, providing a strong locking action which prevents accidental loosening of the fastener combination.

Two of the properties of a threaded fastener combination which are of prime importance are (a) a high torque required to initiate relative turning between the locked elements, and (b) the ability to retain high torque at elevated temperature.

It has been found that these desirable properties are provided when the epoxy resin is mixed with an approximately equal amount of a particular activator sold under the trade name Actiron NX-3, by Synthron, Inc. of Pawtucket, R.I., and said by them to be 2, 4, 6 - Tris (dimethylaminomethyl) phenol. Substantially identical compounds are available from other sources, such for example as from Rohm and Haas, who sells the product under the trademark DMP. For convenience, this curing agent will be referred to herein as the specific phenol.

DETAILED DESCRIPTION

Applicant's discovery of the wholly unexpected advantages of the use of the specific phenol curing agent in the required high proportion to the epoxy (bisphenol A-epichlorohydrin) resin was accidental.

Small samples of material were received from a supplier who had been cooperating in efforts to meet torque-temperature specification requirements. One sample was designated "epoxy resin" and the other simply as "accelerator" with an identifying number. The shipment from the supplier contained no instructions as to the proportions of epoxy resin and curing agent.

In order to test the material, applicant mixed approximately equal parts of the resin and the curing agent labeled as "accelerator", and applied the mixture in fluid condition between the threads of mated threaded members. When the mixture had cured, it was tested to determine the torque which the thread lock could withstand, both at room temperature and at elevated temperatures.

Prior to the present invention, efforts to meet industry specifications of 40 in./lbs for a ⅜" diameter bolt at 275° F. were generally unsuccessful. The new mixture provided a torque capability of 160-200 in./lbs at 275° F. Subsequent tests have established that the material provides 180-200 in./lbs torque up to 275° F. and 70-90 in./lbs at 392° F.

The day following the successful testing of a mixture of substantially equal parts of the unidentified accelerator and epoxy resin, a second shipment was received comprising a container of a material designated only as a "hardener", together with instructions that the accelerator should be added to the hardener in an amount of 5-10% of the hardener to give the superior high temperature-torque characteristics to the cured epoxy resin.

As a matter of interest, when the sample accelerator is added to the sample hardener in an amount of 5-10% of the hardener, as recommended by the supplier, it proved to be a total failure in achieving locking torque at elevated temperature.

Subsequent investigation revealed the fact that the unlabeled accelerator sample which applicant had added directly to the epoxy resin in an amount approximately equal to the amount of resin was in fact 2, 4, 6 - Tris (Dimethylaminomethyl) phenol. This material, sold under the trade name Actiron NX-3, is said by the manufacturer to be useful as an accelerator and/or hardening agent for epoxy resins. Its recommended use is at 8 to 12 parts by weight per 100 parts of epoxy resin.

The same material sold under the registered trademark DMP-30 is recommended as accelerators and hardening agents for epoxy resins. Specifically the manufacturer states that "DMP-30 used alone with an epoxy resin at 6 parts per hundred of resin (phr) gives a pot life of 30 minutes."

So far as applicant has been able to learn, the use of the specific phenol curing agent for epoxy resin in the proportion found to be useful is far removed from the proportions which have previously been considered useful. In fact the parts by volume of the specific phenol which would be suggested by an experienced chemist would be a small fraction of the amount which applicant employs.

Applicant finds that the use of approximately equal parts of the specific phenol and of epoxy was expected by chemists and chemical engineers to produce a polyermized epoxy resin which would be too hard and brittle to be useful for an adhesive application.

Applicant has speculated that the unexpected effectiveness of the locking compound may be explained that the polymerization of the resin takes place in a state of confinement between opposed thread surfaces in which the resin is present in the form of thin lamina as determined by thread clearance and loading between the threaded members. In this environment, embrittlement of the cured resin, if it occurs, may not be harmful, and the capability of the bond to maintain its locking effectiveness under high temperature conditions makes it uniquely useful. This may be due to the fact that cured epoxy resin is in the form of a thin confined lamina or film capable from geometrical consideration of being subject only to shear forces.

It has been found that a particularly useful commercial application of the present invention is in the form of segregated, adjacent, protectively coated deposits of the fluid epoxy monomer and the specific phenol, in approximately equal amounts by volume, in adjacent thread grooves of one of a pair of threaded members, such that when the members of the pair are threaded together, the protective coating is ruptured and the two fluid deposits intermixed in a confined condition between confronting thread surfaces. This type of deposit is disclosed in my prior U.S. Pat. Nos. 4,059,136 and 4,081,012. Similar results may be obtained by micro-encapsulation of either the epoxy resin monomer or the specific phenol curing agent, or both, in which the two liquid components of the mixture are provided in approximately equal amounts, and the capsules ruptured in use.

Direct application of the mixed fluid resin monomer and specific phenol curing agent is of course possible. The fluid mixture may be applied by brushing, or simply by dipping the end of a bolt in the liquid mixture before it is threadedly engaged with the mating threaded member. In any case the fluid mixture of epoxy and the specific phenol are initially present between confronting thread surfaces and is cured in situ to provide the significantly improved locking action effective at elevated temperatures.

Practical application of the invention in the commercial production of threaded locking member has established that optimum results require that the specific phenol curing agent be provided in an amount of 45-55 parts (by volume or weight, which are not materially different) per 100 parts of the mixture. In any case, the amount of the curing agent should be within the range of 35-65 parts of the curing agent per 100 parts of the mixture.

It is recognized that the epoxy monomer in liquid form or the liquid curing agent or both may contain additional material such as glass or ceramic fibers, coloring agents, or in fact any finely divided particulate material.

What is claimed is:

1. A high torque, high temperature resistant thread locking mixture acting between confronting surfaces of a pair of threaded members comprising epoxy resin and a specific phenol curing agent consisting of a mixture of 2, 4, 6 - Tris (dimethylaminomethyl) phenol in approximately equal amounts by volume.

2. A thread locking mixture as defined in claim 1 in which the curing agent constitutes 45-55 percent by volume of the mixture.

3. A thread locking mixture as defined in claim 1 in which the curing agent constitutes 35-65 percent by volume of the mixture.

4. A threaded fastener having deposited in the thread grooves thereof segregated, adjacent, protectively sealed deposits of fluid epoxy monomer and the fluid curing agent 2, 4, 6 - Tris (dimethylaminomethyl) phenol in which the sealing means is adapted to rupture when the fastener is engaged with a mating threaded member, in which the epoxy and the curing agent are in approximately equal amounts by total volume.

5. A fastener as defined in claim 4, in which the curing agent is provided in an amount constituting 45-55 percent by volume of the total volume of resin and curing agent.

6. A fastener as defined in claim 4, in which the curing agent is provided in an amount constituting 35-65 percent by volume of the total volume of resin and curing agent.

7. A fastener as defined in claim 4, in which the epoxy and curing agent are in the form of a plurality of segregated adjacent sealed fluid deposits.

8. A fastener as defined in claim 7, in which the deposits of the fluid epoxy occupy a plurality of axially aligned portions of adjacent thread grooves, and in which the deposits of the fluid curing agent occupy a plurality of axially aligned portions of adjacent thread grooves laterally adjacent to the deposits of the resin, and a protective rupturable film overlying all deposits.

9. A fastener as defined in claim 4, in which the fluid epoxy resin or the curing agent, or both, are separately micro-encapsulated in rupturable capsules.

10. A fluid mixture for application to the threads of a threaded fastener for locking the fastener to a mating threaded member, said mixture composed essentially of uncured fluid epoxy monomer, and an approximately equal amount of 2, 4, 6 - Tris (dimethylaminomethyl) phenol as a curing agent for the resin.

11. A mixture as defined in claim 10, in which the curing agent constitutes 45-55 percent by volume of the mixture.

12. A mixture as defined in claim 10, in which the curing agent constitutes 35-65 percent by volume of the mixture.

* * * * *